United States Patent
Duan et al.

(10) Patent No.: US 12,073,195 B2
(45) Date of Patent: Aug. 27, 2024

(54) RETRIEVAL-AUGMENTED CODE COMPLETION

(71) Applicant: MICROSOFT TECHNOLOGY LICENSING, LLC., Redmond, WA (US)

(72) Inventors: Nan Duan, Beijing (CN); Shuai Lu, Beijing (CN); Neelakantan Sundaresan, Bellevue, WA (US); Alexey Svyatkovskiy, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 150 days.

(21) Appl. No.: 17/740,042

(22) Filed: May 9, 2022

(65) Prior Publication Data

US 2023/0359441 A1    Nov. 9, 2023

(51) Int. Cl.
*G06F 8/33*       (2018.01)
*G06F 40/30*    (2020.01)
*G06N 3/045*    (2023.01)

(52) U.S. Cl.
CPC .............. *G06F 8/33* (2013.01); *G06F 40/30* (2020.01); *G06N 3/045* (2023.01)

(58) Field of Classification Search
None
See application file for complete search history.

(56) References Cited

U.S. PATENT DOCUMENTS

| | | | | |
|---|---|---|---|---|
| 5,715,454 | A  * | 2/1998 | Smith | G06F 8/71 |
| | | | | 707/999.203 |
| 11,132,193 | B1 * | 9/2021 | Rosenbaum | G06F 8/73 |
| 11,635,949 | B2 * | 4/2023 | Gottschlich | G06F 8/436 |
| | | | | 717/143 |
| 11,681,541 | B2 * | 6/2023 | Mostafa | G06F 8/75 |
| | | | | 717/106 |
| 11,720,346 | B2 * | 8/2023 | Wu | G06F 8/70 |
| | | | | 707/741 |
| 2020/0059669 | A1 * | 2/2020 | Nishi | H04N 19/503 |
| 2020/0073879 | A1 * | 3/2020 | Grabau | G06F 16/93 |
| 2020/0249918 | A1 * | 8/2020 | Svyatkovskiy | G06N 3/084 |
| 2020/0311542 | A1 * | 10/2020 | Wang | G06N 3/045 |

(Continued)

OTHER PUBLICATIONS

J. Zhang, X. Wang, H. Zhang, H. Sun and X. Liu, "Retrieval-based Neural Source Code Summarization," 2020 IEEE/ACM 42nd International Conference on Software Engineering (ICSE), Seoul, Korea (South), 2020, pp. 1385-1397. (Year: 2020).*

(Continued)

*Primary Examiner* — Andrew M. Lyons

(57) ABSTRACT

A retrieval-augmented code completion system uses the context of a partially-formed source code snippet of a source code program and a hint to predict the source code tokens needed to complete the partially-formed source code snippet. The hint is a source code segment that completes a semantically-similar source code segment of the partially-formed source code snippet. The hint is found in a retrieval source code database using a hybrid retrieval technique. A deep learning decoder model uses the context of the partially-formed source code snippet and the hint to predict the most likely candidate sequence of source code tokens to complete the partially-formed source code snippet.

20 Claims, 8 Drawing Sheets

(56) References Cited

U.S. PATENT DOCUMENTS

| | | | | |
|---|---|---|---|---|
| 2020/0327118 | A1* | 10/2020 | Ahmed | G06N 3/08 |
| 2021/0097472 | A1* | 4/2021 | Inamdar | G06Q 10/1053 |
| 2021/0141798 | A1* | 5/2021 | Steedman Henderson | G06F 16/3344 |
| 2022/0188081 | A1* | 6/2022 | Ni | G06F 9/453 |
| 2023/0115185 | A1* | 4/2023 | Huang | G06F 40/279 715/762 |

OTHER PUBLICATIONS

Ahmad, et al., "A transformer-based approach for source code summarization", In Proceedings of the 58th Annual Meeting of the Association for Computational Linguistics, Jul. 5, 2020, pp. 4998-5007.

Ahmad, et al., "Unified pre-training for program understanding and generation", In Proceedings of the 2021 Conference of the North American Chapter of the Association for Computational Linguistics: Human Language Technologies, Jun. 6, 2021, pp. 2655-2668.

Allamanis, et al., "Mining Source Code Repositories at Massive Scale using Language Modeling", In Proceedings of the 10th Working Conference on Mining Software Repositories, May 18, 2013, pp. 207-216.

Alon, et al., "Structural language models of code", In Proceedings of International conference on machine learning, Nov. 21, 2020, 12 Pages.

Arwan, et al., "Source code retrieval on stackover-flow using Ida", In Proceedings of 2015 3rd International Conference on Information and Communication Technology, May 27, 2015, pp. 295-299.

Baker, Brendas. , "Finding clones with dup: Analysis of an experiment", In Journal of IEEE Transactions on Software Engineering, vol. 33, Issue 9, Aug. 13, 2007, pp. 608-621.

Brown, et al., "Language Models are Few-Shot Learners", In repository of arXiv:2005.14165v4, Jul. 22, 2020, pp. 1-75.

Bui, et al., "Self-supervised contrastive learning for code retrieval and summarization via semantic-preserving transformations", In Proceedings of the 44th International ACM SIGIR Conference on Research and Development in Information Retrieval, Jul. 11, 2021, pp. 511-521.

Cambronero, et al., "When deep learning met code search", In Proceedings of the 2019 27th ACM Joint Meeting on European Software Engineering Conference and Symposium on the Foundations of Software Engineering, Aug. 26, 2019, pp. 964-974.

Chen, et al., "A Simple Framework for Contrastive Learning of Visual Representations", In Proceedings of International Conference on Machine Learning, Nov. 21, 2020, 11 Pages.

Chen, et al., "Evaluating Large Language Models Trained on Code", In Repository of arXiv:2107.03374v2, Jul. 14, 2021, 35 Pages.

Churchill, et al., "Semantic program alignment for equivalence checking", In Proceedings of the 40th ACM SIGPLAN Conference on Programming Language Design and Implementation, Jun. 8, 2019, pp. 1027-1040.

Clement, et al., "Long-range modeling of source code files with ewash: Extended window access by syntax hierarchy", In Proceedings of the 2021 Conference on Empirical Methods in Natural Language Processing, Nov. 7, 2021, pp. 4713-4722.

Clement, et al., "PYMT5: Multi-Mode Translation of Natural Language and Python Code with Transformers", In Proceedings of the 2020 Conference on Empirical Methods in Natural Language Processing, Nov. 16, 2020, pp. 9052-9065.

Debray, et al., "Compiler Techniques for Code Compaction", In Journal of ACM Transactions on Programming Languages and Systems, vol. 22, Issue 2, Mar. 1, 2000, pp. 378-415.

Devlin, et al., "BERT: Pre-training of Deep Bidirectional Transformers for Language Understanding", In Proceedings of the Conference of the North American Chapter of the Association for Computational Linguistics: Human language Technologies, Jun. 2, 2019, pp. 4171-4186.

Drain, et al., "Generating bug-fixes using pretrained transformers", In Proceedings of the 5th ACM SIGPLAN International Symposium on Machine Programming, Jun. 20, 2021, pp. 1-8.

Fang, et al., "CERT: Contrastive Self-supervised Learning for Language Understanding", In Repository of arXiv:2005.12766v2, Jun. 18, 2020, pp. 1-16.

Feng, et al., "CodeBERT: A Pre-Trained Model for Programming and Natural Languages", In Repository of arXiv:2002.08155v4, Sep. 18, 2020, 12 Pages.

Gao, et al., "SimCSE: Simple Contrastive Learning of Sentence Embeddings", In Repository of arXiv:2104.08821v3, Sep. 9, 2021, 17 Pages.

Gu, et al., "Deep api learning", In Proceedings of the 2016 24th ACM SIGSOFT International Symposium on Foundations of Software Engineering, Nov. 1, 2016, pp. 631-642.

Gu, et al., "Deep Code Search", In Proceedings of the IEEE/ACM 40th International Conference on Software Engineering, May 27, 2018, pp. 933-944.

Guo, et al., "Graphcodebert: Pre-training code representations with data flow", In Proceedings of International Conference on Learning Representations, Sep. 28, 2020, pp. 1-18.

Guo, et al., "Learning to complete code with sketches", In Proceedings of International Conference on Learning Representations, Sep. 29, 2021, pp. 1-23.

Guo, et al., "Unixcoder: Unified crossmodal pre-training for code representation", In Repository of arXiv:2203.03850v1, Mar. 8, 2022, 14 Pages.

Hashimoto, et al., "A Retrieve-and-Edit Framework for Predicting Structured Outputs", In Proceedings of the 32nd International Conference on Neural Information Processing Systems, Dec. 3, 2018, pp. 1-11.

Hayati, et al., "Retrieval-based neural code generation", In Proceedings of the 2018 Conference on Empirical Methods in Natural Language Processing, Oct. 31, 2018, pp. 925-930.

He, et al., "Momentum Contrast for Unsupervised Visual Representation Learning", In Proceedings IEEE/CVF Conference on Computer Vision and Pattern Recognition, Jun. 13, 2020, pp. 9726-9735.

Hindle, et al., "On the Naturalness of Software", In Journal of Communications of the ACM, vol. 59, Issue 5, Apr. 26, 2016, pp. 122-131.

Hu, et al., "Summarizing source code with transferred api knowledge", In Proceedings of the 27th International Joint Conference on Artificial Intelligence, Jul. 13, 2018, 7 Pages.

Husain, et al., "CodeSearchNet Challenge: Evaluating the State of Semantic Code Search", In Repository of arXiv:1909.09436v3, Jun. 8, 2020, 6 Pages.

Zacard, et al., "Leveraging passage retrieval with generative models for open domain question answering", In Proceedings of the 16th Conference of the European Chapter of the Association for Computational Linguistics, Apr. 19, 2021, pp. 874-880.

Jain, et al., "Contrastive code representation learning", In Repository of arXiv:2007.04973v4, Jul. 9, 2020, 19 Pages.

Karampatsis, et al., "Big code != big vocabulary: Open-vocabulary models for source code", In Proceedings of 2020 IEEE/ACM 42nd International Conference on Software Engineering, Oct. 5, 2020, pp. 1073-1085.

Karpukhin, et al., "Dense Passage Retrieval for Open-Domain Question Answering", In Proceedings of the 2020 Conference on Empirical Methods in Natural Language Processing, Nov. 16, 2020, pp. 6769-6781.

Kim, et al., "Code Prediction by Feeding Trees to Transformers", In Proceedings of IEEE/ACM 43rd International Conference on Software Engineering, May 22, 2021, pp. 150-162.

Lewis, et al., "Bart: Denoising sequence-to-sequence pretraining for natural language generation, translation, and comprehension", In Proceedings of the 58th Annual Meeting of the Association for Computational Linguistics, Jul. 5, 2020, pp. 7871-7880.

Li, et al., "Code completion with neural attention and pointer networks", In Proceedings of the 27th International Joint Conference on Artificial Intelligence, Jul. 13, 2018, pp. 4159-4165.

(56) References Cited

OTHER PUBLICATIONS

Li, et al., "Editsum: A retrieve-and-edit framework for source code summarization", In 36th IEEE/ACM International Conference on Automated Software Engineering, Nov. 15, 2021, pp. 155-166.

Liu, et al., "Multitask learning based pre-trained language model for code completion", In Proceedings of the 35th IEEE/ACM International Conference on Automated Software Engineering, Jan. 27, 2021, pp. 473-485.

Liu, et al., "Neural Code Completion", In Proceedings of 5th International Conference on Learning Representations, Apr. 2017, pp. 1-14.

Lu, et al., "CodeXGLUE: A Machine Learning Benchmark Dataset for Code Understanding and Generation", In Repository of arXiv:2102.04664v2, Mar. 16, 2021, 14 Pages.

Luan, et al., "Aroma: code recommendation via structural code search", In Proceedings of the ACM on Programming anguages, Oct. 10, 2019, 28 Pages.

Ma, et al., "A replication study of dense passage retriever", In Repository of arXiv:2104.05740v1, Apr. 12, 2021, 8 Pages.

Mashhadi, et al., "Applying codebert for automated program repair of java simple bugs", In Repository of arXiv:2103.11626v2, Mar. 30, 2021, 5 Pages.

Massalin, Henry, "Superoptimizer: a look at the smallest program", In Journal of ACM SIGARCH Computer Architecture News, vol. 15, Issue 5, Oct. 1, 1987, pp. 122-126.

Oord, et al., "Representation learning with contrastive predictive coding", In Repository of arXiv:1807.03748v1, Jul. 10, 2018, pp. 1-13.

Parvez, et al., "Retrieval augmented code generation and summarization", In Repository of arXiv:2108.11601v2, Sep. 10, 2021, 16 Pages.

Puri, et al., "Project codenet: A large-scale ai for code dataset for learning a diversity of coding tasks", In Repository of arXiv:2105.12655v2, Aug. 29, 2021, pp. 1-22.

Rabin, et al., "On the generalizability of neural program models with respect to semantic-preserving program transformations", In Journal of Information and Software Technology, vol. 135, Jul. 1, 2021, pp. 1-13.

You, et al., "Malware obfuscation techniques: A brief survey", In Proceedings of 2010 International Conference on Broadband, Wireless Computing, Communication and Applications, Nov. 4, 2010, pp. 297-300.

Radford, et al., "Improving Language Understanding by Generative Pre-Training", Retrieved From: https://www.cs.ubc.ca/~amuham01/LING530/papers/radford2018improving.pdf, Jun. 11, 2018, pp. 1-12.

Radford, et al., "Language Models are Unsupervised Multitask Learners", In Journal of OpenAI Blog, vol. 1, Issue 8, Feb. 24, 2019, 24 Pages.

Radford, et al., "Learning Transferable Visual Models From Natural Language Supervision", In Repository of arXiv:2103.00020v1, Feb. 26, 2021, 48 Pages.

Raffel, et al., "Exploring the Limits of Transfer Learning with a Unified Text-to-Text Transformer", In Repository of arXiv:1910.10683v2, Oct. 24, 2019, pp. 1-53.

Raychev, et al., "Probabilistic Model for Code with Decision Trees", In Proceedings of ACM SIGPLAN Notices, vol. 51, Issue 10, Oct. 19, 2016, pp. 731-747.

Reimers, et al., "Sentence-bert: Sentence embeddings using siamese bert-networks.", In Proceedings of the 2019 Conference on Empirical Methods in Natural Language Processing and the 9th International Joint Conference on Natural Language Processing, Nov. 3, 2019, pp. 3982-3992.

Robertson, et al., "The probabilistic relevance framework: BM25 and beyond", In Journal of Foundations and Trends in Information Retrieval, vol. 3, Issue 4, Apr. 1, 2009, 59 Pages.

Roy, et al., "An empirical study of function clones in open source software", In Proceedings of 15th Working Conference on Reverse Engineering, Oct. 15, 2008, pp. 81-90.

Svajlenko, et al., "Evaluating clone detection tools with bigclonebench", In Proceedings of IEEE International Conference on Software Maintenance and Evolution, Sep. 29, 2015, pp. 131-140.

Svyatkovskiy, et al., "Fast and memory-efficient neural code completion", In Proceedings of IEEE/ACM 18th International Conference on Mining Software Repositories, May 17, 2021, pp. 329-340.

Svyatkovskiy, et al., "IntelliCode Compose: Code Generation using Transformer", In Proceedings of the 28th ACM Joint Meeting on European Software Engineering Conference and Symposium on the Foundations of Software Engineering, Nov. 8, 2020, 1433-1443.

Tu, et al., "On the Localness of Software", In Proceedings of the 22nd ACM SIGSOFT International Symposium on Foundations of Software Engineering, Nov. 16, 2014, pp. 269-280.

Vaswani, et al., "Attention is all you need", In Journal of Advances in neural information processing systems, vol. 30, Dec. 4, 2017, pp. 1-11.

Wang, et al., "Codet5: Identifier-aware unified pre-trained encoder-decoder models for code understanding and generation", In Repository of arXiv:2109.00859v1, Sep. 2, 2021, 13 Pages.

Wang, et al., "Syncobert: Syntax-guided multi-modal contrastive pre-training for code representation", In Repository of arXiv:2108.04556v3, Sep. 9, 2021, 9 Pages.

Wei, Bolin, "Retrieve and refine: exemplar-based neural comment generation", In Proceedings of 34th IEEE/ACM International Conference on Automated Software Engineering, Nov. 11, 2019, pp. 1250-1252.

Wu, et al., "Unsupervised feature learning via nonparametric instance-level discrimination", In Repository of arXiv:1805.01978v1, May 5, 2018, pp. 1-10.

Xi, Hongwei, "Dead code elimination through dependent types", In Proceedings of the First International Workshop on Practical Aspects of Declarative Languages, Jan. 18, 1999, 15 Pages.

Xia, et al., "What do developers search for on the web?", In Journal of Empirical Software Engineering, vol. 22, Issue 6, Dec. 1, 2017, pp. 3149-3185.

* cited by examiner

RETRIEVAL-AUGMENTED CODE COMPLETION

BACKGROUND

Code completion is a tool that predicts the next string of characters that a developer (e.g., user, end-user, programmer, etc.) may type into a source code program in a source code development tool, such as a source code editor, integrated development environment, and the like. The tool presents the developer with a list of possible candidates to complete a partially-formed source code snippet. The partially-formed source code snippet may include a few characters of a code element. A popup menu may appear with several suggested candidates that the developer may utilize. This assistance is beneficial since it speeds up the development time and reduces common errors, such as typos.

Machine learning models have been used in code completion systems to more accurately predict candidates that complete the partially-formed source code snippet. These models are often trained on large-scale source code datasets in order to achieve the high-level of accuracy required for a code completion task. As such, the models are extremely large having billions of parameters thereby requiring a significant amount of computing resources to train and deploy. At times, the size of these models hampers the deployment of such models in code completion systems with limited computing resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A retrieval-augmented code completion system uses the context of a partially-formed source code snippet of a source code program and a hint to predict the source code tokens needed to complete the partially-formed source code snippet. The hint completes a lexically or semantically-similar source code segment to the partially-formed source code snippet. A deep learning decoder model uses the combination of the context and the hint to predict the most likely candidate sequences of source code tokens to complete the partially-formed source code snippet.

The semantically-similar source code segment is retrieved from a retrieval source code database using a hybrid retrieval technique. The retrieval source code database is constructed with equally-sized source code segments from various source code files arranged in the database in the same consecutive order as they appear in the original source code file. The database includes an embedding vector index and a sparse vector index for each source code segment. The hybrid retrieval technique uses an embedding or dense vector and a sparse vector to search for source code segments from the database. The hybrid retrieval technique is based on a term-frequency based retrieval method and an embedding-based retrieval method.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
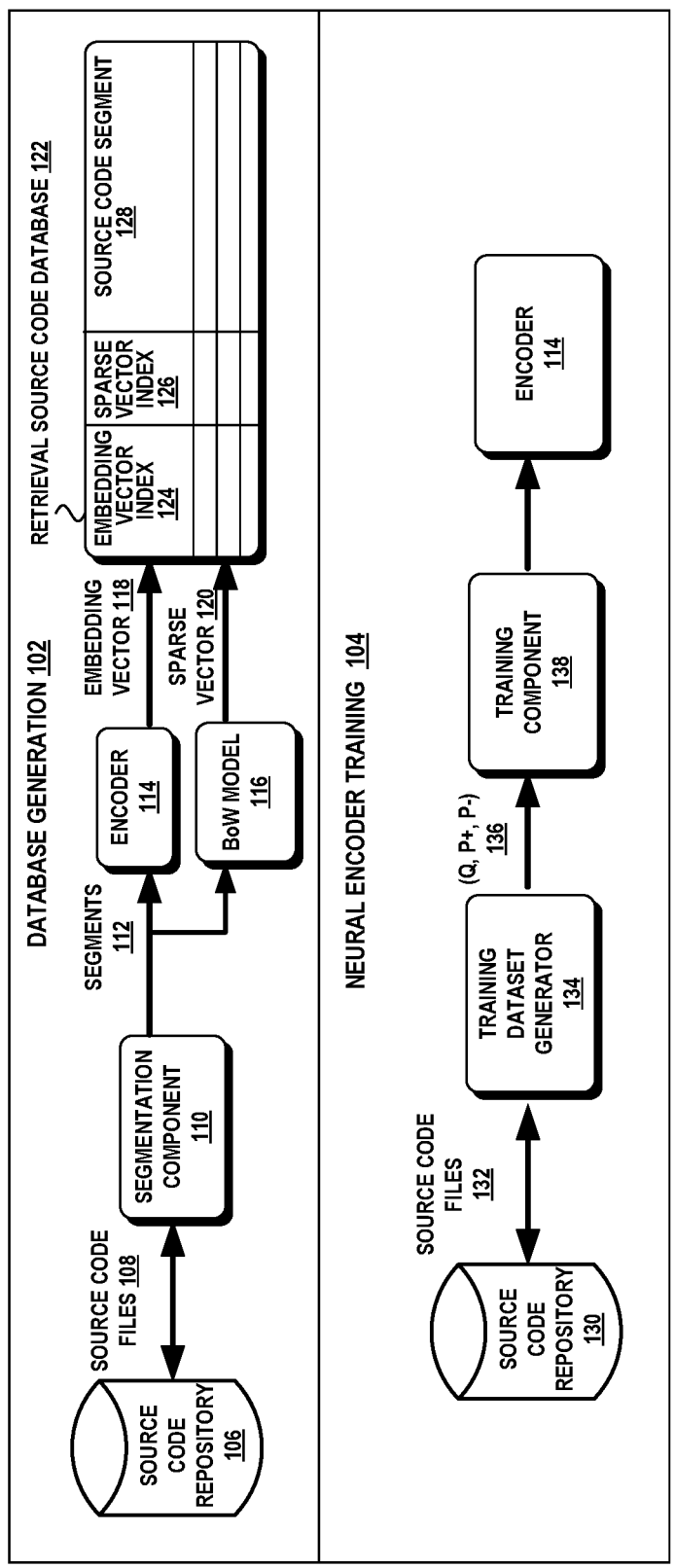
FIG. 1 is a schematic diagram illustrating an exemplary configuration of an offline processing phase for the generation of the retrieval source code database and the training of the neural encoder.

Aspects of the present disclosure pertain to a code completion framework that augments, the context of a partially-formed source code snippet to be completed, with a source code snippet that completes a lexically or semantically-similar source code snippet of the partially-formed source code snippet. The combination of the context of the partially-formed source code snippet and the source code snippet that completes the semantically-similar source code snippet is used to make predictions on the sequence of source code tokens most likely to complete the partially-formed source code snippet.

In one aspect, the semantically-similar source code segment is found in a retrieval source code database which contains equally-sized source code segments from various source code files. The source code segments are stored in the database in the same consecutive order as they appear in the original source code file. The source code segments are fixed-size portions of a source code file and may be fragments of a complete expression, statement, or code element.

A hybrid retriever is used to search for the source code segment from the database that has the closest semantic similarity to the partially-formed source code snippet. The hybrid retriever uses a sparse retriever based on a term-frequency technique and a dense retriever using an embedding-based technique. The hybrid retriever computes a score for each source code segment in the database that is a linear combination of the scores based on the similarity of the sparse vectors of the partially-formed source code snippet and each source code segment in the retrieval source code database and the similarity of the embedding vectors of the partially-formed source code snippet and each source code segment in the retrieval source code database. The source code segment having the highest score is deemed the closest semantically-similar source code segment.

The use of the hybrid encodings, dense vector and sparse vector, to search for the semantically-similar source code segment produces better results. The sparse retriever is a term-frequency based retrieval technique that captures lexical information and is sensitive to code identifiers. The dense retriever captures syntactic and semantic information. In code completion tasks, the retriever is expected to comprehend the intent of the partially-formed source code in order to retrieve semantically-similar source code. However, programmers are prone to copying-and-pasting existing source code where lexical similarity is needed. Lexical similarity refers to the use of the same tokens although not in the same syntax. The use of the hybrid retriever combines results of both retrieval methods to account for semantic similarity that may come from lexical similarity and similar functionality.

The source code snippet in the database immediately following the closest semantically-similar source code snippet is a hint that is given to the decoder. The hint is the best predictor of the source code that is likely to complete the partially-formed source code snippet. The inclusion of the hint guides an auto-regressive deep learning decoder towards predicting the most relevant candidates to complete the partially-formed source code snippet.

In this manner, the accuracy of the predictions made by the model does not require training on a large corpus of data. Training on a large training data increases the number of parameters used by the model to achieve a high level of accuracy. This increases the size of the model and the computing resources needed to train and deploy the model.

In addition, this approach uses a non-parametric external memory or indices to search for the code that completes the semantically-similar source code snippet. The addition of the non-parametric external memory enables the model to achieve a high level of accuracy with a relatively small number of parameters and hence, smaller-sized model.

Attention now turns to a more detailed description of the system, components, methods and devices used in the various aspects of the source code adaptation technique.

System

FIG. 1 illustrates a block diagram of an exemplary system 100 in which various aspects of the invention may be practiced. As shown in FIG. 1, system 100 includes a database generation phase 102 that constructs the retrieval source code database 122 and a neural encoder training phase 104 that trains an encoder 114 to generate encodings or embeddings for each source code segment 128 in the database 122. In one aspect, the database generation phase 102 and the encoder training phase 104 are offline processes that are performed prior to the deployment of the database and encoder in a real-time code completion system.

In the database generation phase 102, a segmentation component 110 extracts source code files 108 from a source code repository 106 and splits each source code file into fixed-size segments of source code 112. Each source code segment 112 is accessible by an embedding or dense vector 118 generated by the encoder 114 and a sparse vector 120 that is generated by a Bag-of-Words ("BoW") model 116.

The Bag-of-Words model 116 describes the frequency of the unique source code tokens used in the source code files that are included in the database 122. The Bag-of-Words model 116 is trained on the source code files 108 of the database in order to develop a vocabulary of unique source code tokens. In an aspect, the vocabulary includes n-grams or n-token sequences of source code tokens. The Bag-of-Words model 116 includes the frequency of each n-gram token over all the n-gram tokens in the database 122.

The Bag-of-Words model 120 is used to create a sparse vector 120 for each source code segment 112 in the database 122 that describes the frequency of each n-gram in the source code segment. The sparse vector 120 is then used as an index to access source code segment 128 in the database 122. The Bag-of-Words model 116 is also used to generate the sparse vector for the partially-formed source code snippet that is used to search for a semantically-similar source code segment.

In the encoder training phase 104, the encoder 114 is trained to generate an embedding space such that source code segments with similar or equivalent semantics have close embeddings and dissimilar source code segments have embeddings that are far apart. The embedding space includes the encodings or embeddings of each source code segment in the retrieval source code database 122.

The encoder 114 is trained on source code files 132 by a training component 138 using a training dataset 136 generated by a training dataset generator 134. The training dataset 136 consists of a partially-formed source code snippet Q, a positive code sample, P+ and n negative code samples P−, where n>0. The partially-formed source code samples Q are extracted from source code files 132 of a source code repository 130 and truncated randomly to represent a partially-formed source code snippet sample. A positive code sample, P+, is a semantically-similar source code segment to the partially-formed source code snippet, Q. A negative code sample, P−, is a source code segment that is not semantically-similar to the partially-formed code segment. The negative code samples can be randomly selected from unrelated source code.

A semantically-similar source code segment is one that performs the same functionality although syntactically different. Syntactic similarity is based on a similar syntax. However, it should be noted that in some cases, a semantically-similar source code segment may be syntactically similar.

In some situations, positive code samples are not readily available and to generate the positive code samples would require a considerable amount of compilation and execution cost. In order to compensate for this issue, the training dataset generator 134 creates the positive code samples from source code snippets with the same functionality by applying several semantic-preserving transformations to the original source code sample.

In one aspect, identifier renaming and dead code insertion are used to create the positive code samples. Identifier renaming is a method of renaming one identifier with another. In one aspect, variable names and method names are renamed since other identifiers cannot be changed arbitrarily like built-in types or API invocations.

Dead code insertion puts dead source code into a code fragment at a particular location. Dead code is a source code snippet that cannot be reached or is reachable but whose results cannot be used in another computation. In this manner, the altered code is functionally similar to the original source code.

The training dataset 136 is used by the training component 138 to train the encoder 114 to learn to generate embeddings (i.e., embedding vector) so that embeddings of semantically-similar source code snippets are close to each other and embeddings of semantically-dissimilar source code snippets are far apart.

Figure 2:
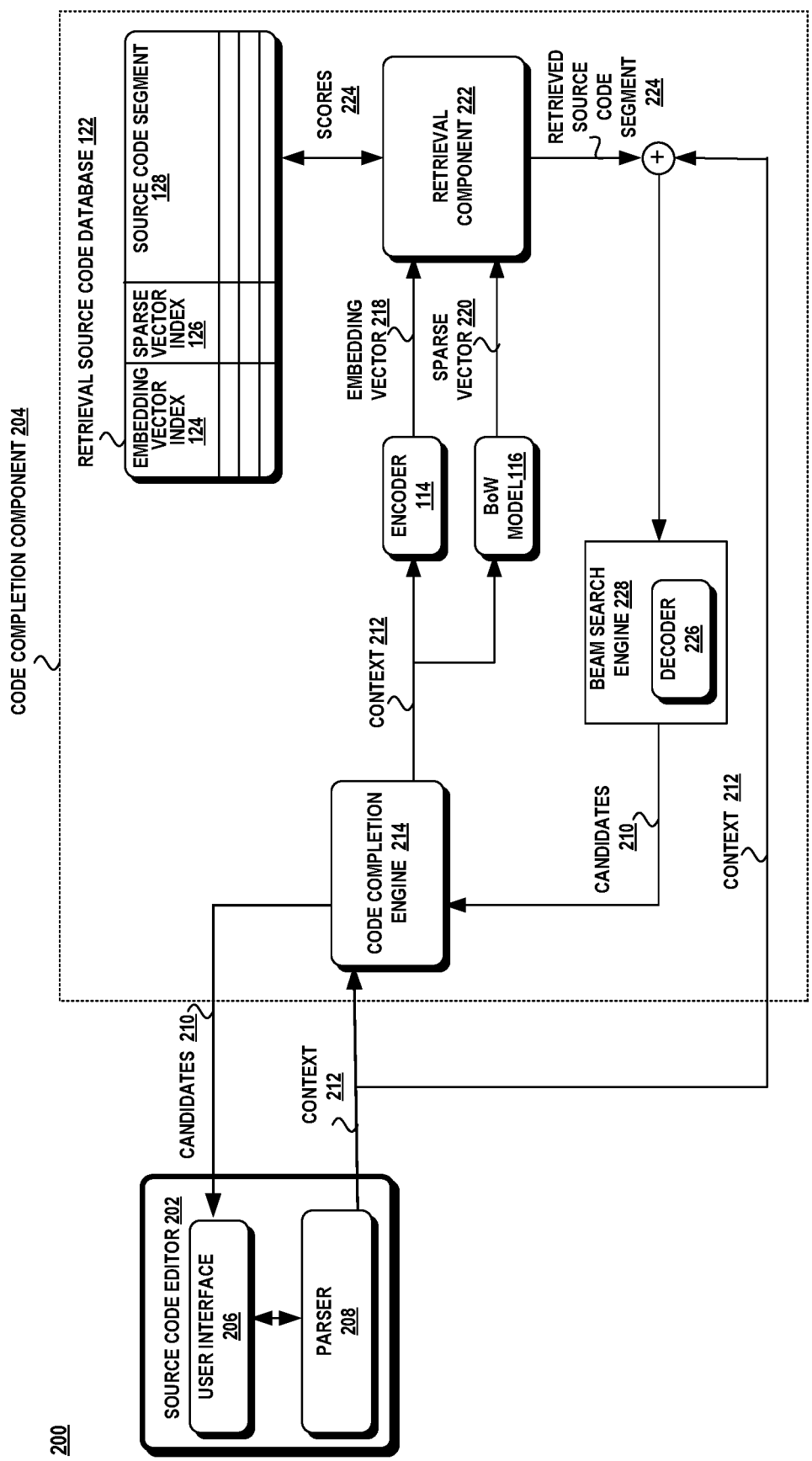
FIG. 2 is a schematic diagram illustrating an exemplary configuration of the components of the real-time processing phase of the retrieval-augmented code completion system.

FIG. 2 illustrates a block diagram of an exemplary code completion system 200. The system 200 includes a source code editor 202 and a code completion component 204. In one or more aspects, the code completion component 204 may be a function or feature integrated into the source code editor 202, an integrated development environment (IDE), or other application. The code completion component 204 may be embodied as a tool or feature that can be an add-on, plug-in, extension and/or component of a source code editor and/or IDE.

The source code editor 202 includes a user interface 206 and a parser 208. The code completion component 204 includes a code completion engine 214, the encoder 114, the Bag-of-Words model 116, the retrieval source code database 122, a retrieval component 222, a beam search engine 228, and a decoder 226.

The user interface 206 includes a set of features or functions for writing and editing a source code program. The user interface 206 may utilize a pop-up window to present a list of possible candidates 210 for completion thereby allowing a developer to browse through the candidates and to select one from the list. In this manner, code completion serves as an assistance to writing code quickly. The parser 208 reads the source code in the source code editor 202 and generates a corresponding syntax tree and semantic model that is used to extract the context of the partially-formed source code snippet 212. The parser 208 also updates the syntax tree and semantic model as the developer creates and edits the source code in the source code editor 202.

At certain points in the editing process, the user interface 206 will detect that the user has entered a particular character which will initiate code completion. The user interface 206 will then request candidates from the code completion component 204 to present to the developer.

The code completion engine 214 receives the context of the partially-formed source code snippet 212 and generates one or more candidates 210 to complete the partially-formed source code snippet 212. The code completion engine 214 transforms the context into a sequence of tokens that is input into the encoder 114 and the BoW model 116. The encoder 114 generates an embedding vector 218 for the context that is transmitted to the retrieval component 222. The BoW model generates a sparse vector 220 that is transmitted to the retrieval component 222. The sparse vector 220 is a term-frequency vector that represents the frequency of each unique source code token used in the partially-formed source code snippet.

The retrieval component 222 uses the embedding vector of the context of the partially-formed source code snippet 218 and the sparse vector representing the context of the partially-formed source code snippet 220 to search for the source code segment closest to the context of the partially-formed source code snippet. The context includes the partially-formed source code snippet and a number of tokens that precede the partially-formed source code snippet.

The retrieval component generates a score for each source code segment 128 in the database and identifies the source code segment having the highest score. The retrieval component 222 obtains the source code segment immediately following the source code segment having the highest score 224. The source code segment immediately following the highest-scoring source code segment contains the source code that completes the highest-scoring source code segment.

The retrieved source code segment context 224 is combined with the context and input into the beam search engine 228. The beam search engine 228 uses the decoder 226 to predict candidates 210 to complete the partially-formed source code snippet. The candidates are transmitted to the code completion engine 214 which returns them to the user interface 206.

The user interface 206 in turn provides the candidates 210 to the developer. In one aspect, the user interface 206 may provide the candidates from the code completion engine 214 with other candidates from other code completion tools. However, the techniques describe herein are not constrained to any particular mechanism for providing the candidates to a developer and the manner in which the candidates are displayed to the user (e.g., pop-up window, etc.).

It should be noted that FIGS. 1 and 2 show components of the system in one aspect of an environment in which various aspects of the invention may be practiced. However, the exact configuration of the components shown in FIGS. 1 and 2 may not be required to practice the various aspects and variations in the configuration shown in FIGS. 1 and 2 and the type of components may be made without departing from the spirit or scope of the invention.

Attention now turns to a description of the various embodiments of the encoder and decoder models.

Neural Transformer Models

A neural transformer with attention model is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

It should be noted that the term neural transformer model and neural transformer with attention model are used interchangeably. It should also be noted that the aspects disclosed herein are described with respect to neural transformer with attention models. However, the techniques are not limited to these types of neural networks and can be applied to other types of deep learning models that utilize a neural network with a fixed-size context window.

Figures 3A, 3B:
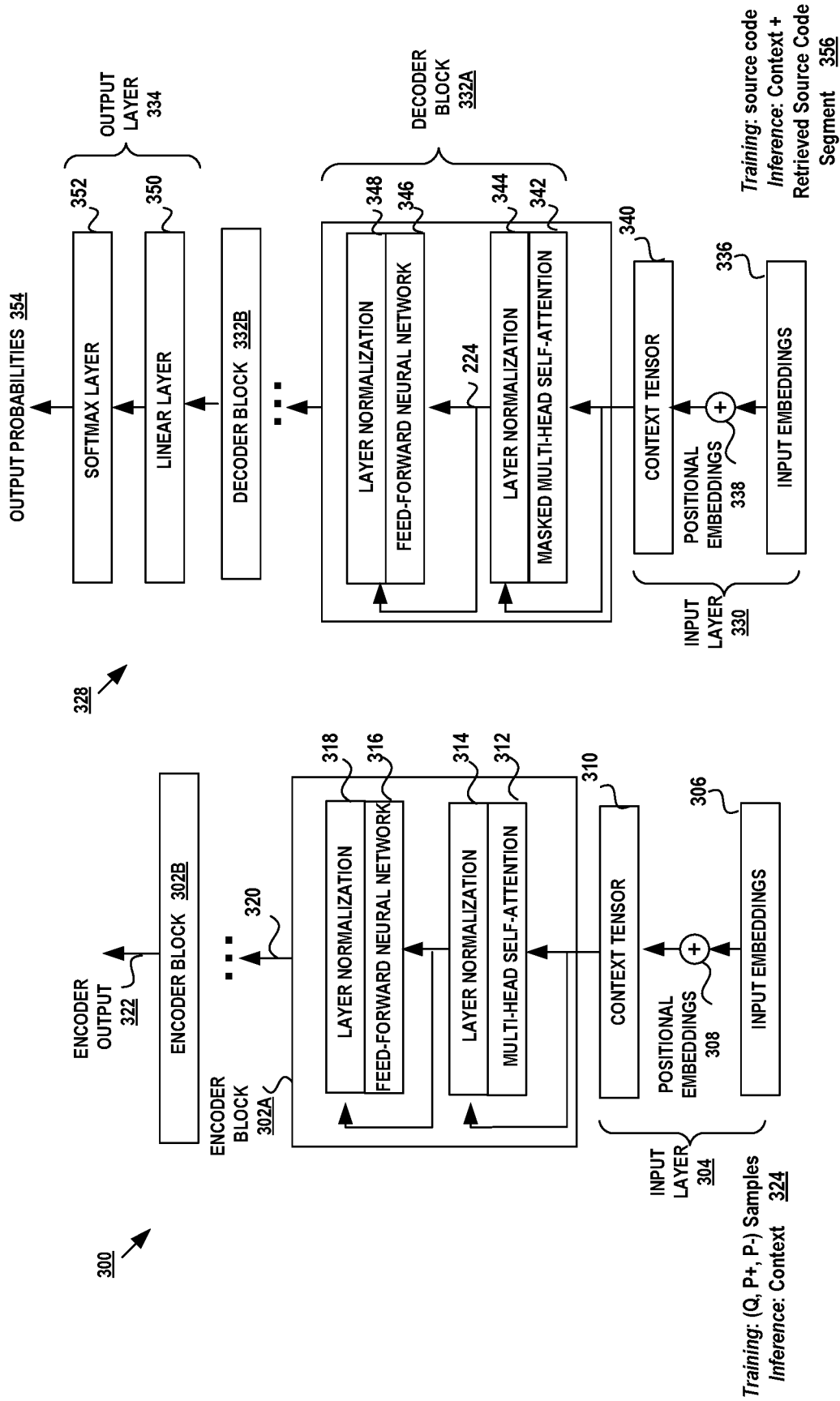
FIG. 3A is a schematic diagram illustrating an exemplary architecture of the neural encoder transformer model with attention and FIG. 3B is a schematic diagram illustrating an exemplary architecture of the neural decoder transformer model with attention.

FIG. 3A shows an exemplary structure of the encoder as a neural transformer model with attention in an encoder-only configuration and FIG. 3B shows an exemplary structure of the decoder as a neural transformer model with attention in a decoder-only configuration. In an aspect, the encoder is a multi-layer bidirectional neural transformer with attention. It should be noted that the phrases "neural encoder transformer model with attention," "encoder" and "neural encoder transformer model" are used interchangeably. The phrases "neural decoder transformer model with attention", "decoder", and "neural decoder transformer model" are used interchangeably.

Referring to FIG. 3A, the encoder model 300 contains one or more encoder blocks 302A-302B ("302"). The input layer 304 to the first encoder block 302A includes an input embedding layer 306 containing embeddings of the input sequence, a positional embedding layer 308, and a context tensor 310. The positional embeddings 308 are used to retain the order of the tokens in the input sequence. The context tensor 310 contains the positional embeddings added to the input embedding 306.

An encoder block 302 consists of two layers. The first layer includes a multi-head self-attention component 312 followed by layer normalization component 314. The second layer includes a feed-forward neural network 316 followed by a layer normalization component 318. The context tensor 310 is input into the multi-head self-attention layer 312 of the encoder block 302 with a residual connection to layer normalization 314. The output of the layer normalization 314 is input to the feed forward neural network 316 with another residual connection to layer normalization 318. The output of the encoder block 302A is a set of hidden representations 320. The set of hidden representations 320 is then sent through additional encoder blocks, if multiple encoder blocks exist.

Attention is used to decide which parts of the input sequence are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head self-attention component 312 takes a context tensor 310 and weighs the relevance of each token represented in the context tensor to each other by generating attention weights for each token in the input embeddings 306. In one aspect, the attention function is scaled dot-product attention which is described mathematically as follows:

$$\text{Attention } (Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$, output values which are concatenated to a final value:

MultiHead(Q,K,V)=Concat(head$_1$, . . . ,head$_h$)$W^o$, where head$_i$=Attention(QW$_i^Q$, KW$_i^K$, VW$_i^V$), with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 314 that precedes the feed forward neural network 316 and a second layer normalization 318 that follows the feed forward neural network 316.

FIG. 3B illustrates an exemplary configuration of the neural decoder transformer model with attention 328. The neural decoder transformer model 328 includes multiple stacked decoder blocks 332A-332B ("332"). The decoder 328 predicts each token $t_i$ in the target language one-by-one at each time step conditioned on all previously-generated target tokens $t_1, \ldots t_{i-1}$. Each decoder block 332 consists of two layers. The first layer includes a masked multi-head self-attention component 342 followed by a layer normalization component 344. The output of the layer normalization component 344 is input into the second layer which includes a feed forward neural network 346 with a residual connection to layer normalization component 348.

The masked multi-head self-attention component 342 receives the output embeddings of the previous timestep. The masked multi-head self-attention component 342 masks the output embeddings from future time steps. The feed-forward neural network 346 processes each output encoding separately. A layer normalization component 344, 348 is used between the layers in order to normalizes the inputs across the features.

The output layer 334 includes a linear layer 350 and a softmax layer 352. The linear layer 350 projects the vector produced by the stack of decoders into a logits vector. The softmax layer 352 then turns the scores of the logits vector into output probabilities for each token in the vocabulary V which are positive and normalized 354.

Training is the process where the model's parameters (i.e., embeddings, weights, biases) are learned from the training dataset. Inference is the process where the model makes predictions given an input sequence of data. For the encoder 300, the training dataset consists of training samples of the form (Q, P+, P$^-_1$, . . . P$^-_n$), where Q is the partially-formed source code snippet, P+ is the positive sample, and P$^-_1$, . . . P$^-_n$ are the n negative samples 324. During inference, the first encoder block of the model receives the context of the partially-formed source code snippet 324.

During training, the first decoder block 332A receives an initial input embedding 336 that includes a start token, <START> and an input sequence representing a source code snippet. Thereafter, at each subsequent time step, the input embedding 336 is the output embedding shifted by one token 356. During inference, the initial input to the first decoder block 332A contains a <START> token and the combination of the context and the retrieved source code segment. At each subsequent time step the input is a shifted sequence of the output embeddings from the previous time step to which the positional embeddings are added forming context tensor 340.

Methods

Attention now turns to a more detailed description of the methods used in the system for retrieval-augmented code completion. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
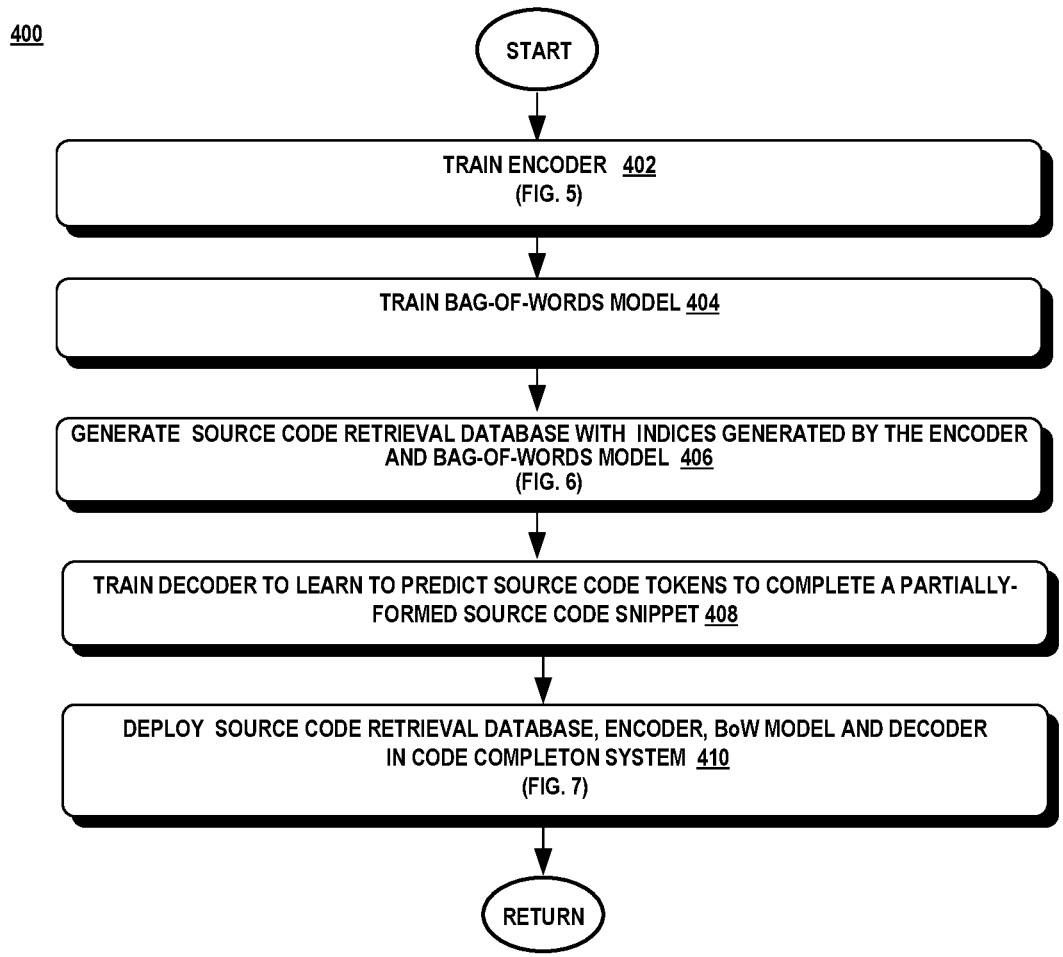
FIG. 4 is a flow diagram illustrating an exemplary method for generating models and constructing the retrieval source code database.

FIG. 4 illustrates an exemplary method 400 for generating the models and database used in the retrieval-augmented code completion system. The method uses an offline process to train the neural encoder transformer model (block 402), to train the Bag-of-Words model (block 404), to generate the source code retrieval database with indices generated by the neural encoder transformer model and the Bag-of-Words model (block 406), and to train the neural decoder transformer model (block 408). Once the source code retrieval database, the neural encoder transformer model, the bag-of-words model, and the neural decoder transformer model are generated and validated, they are deployed in a code completion system for real-time processing (block 410).

Training the Encoder Model

Figure 5:
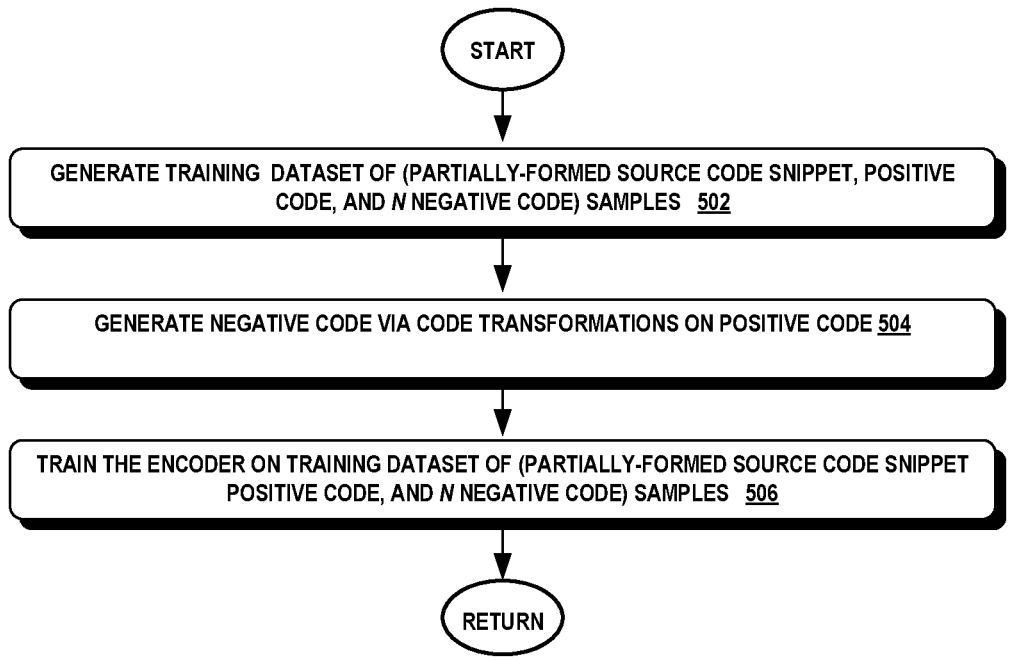
FIG. 5 is a flow diagram illustrating an exemplary method for training the neural encoder transformer model with attention.

Turning to FIGS. 1 and 5, there is shown an exemplary process 500 for training the neural encoder transformer model with attention. The training dataset generator 134 generates a self-supervised training dataset from various source code files 132 from a source code repository 130. The training dataset includes numerous training samples where each training sample includes a partially-formed source code snippet, a positive code and n negative codes. (Collectively, block 502).

A source code repository 130 may be a file archive and web hosting facility that stores large amounts of source code either privately or publicly. A source code repository 130 can be structured as a version control system, such as GIT, Mercurial, etc. The source code repository 130 may be a project or directory storing a particular collection of source code files. The source code files residing in the source code repository 130 vary and may be written in different programming languages. The selected source code files 132 can come from different domains, such as without limitation, scientific computing, web development, dataflow programming, machine learning, and the like. (Collectively, block 502).

The partially-formed source code snippet is generated from a fully-formed source code snippet that is altered to exclude a portion of the source code. The corresponding negative source code is generated by randomly selecting n source code snippets unrelated to the partially-formed source code snippets. (Collectively, block 504).

The positive code represents a semantically-similar source code snippet to the partially-formed source code snippet. Searching for semantically-similar code is a complex process requiring extensive code compilation and execution costs which is unrealistic for mining a large source code database. In order to overcome this obstacle, transformations are made on the partially-formed source code snippet to generate the positive code. The transformations include identifier renaming and dead code insertion. (Collectively, block 506).

The training component 138 then trains the neural encoder transformer model with the training dataset 136. Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 506).

The neural encoder transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 506).

For each input sequence of each batch in each epoch, the T-ordered sequences of subtokens are then mapped into numeric vectors and then into respective subtoken embeddings and positional embeddings. An embedding is a learned representation for the text-based subtokens where subtokens that have a common meaning have a common representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into the neural transformer model. (Collectively, block 506).

Initial values are generated for the subtoken embedding and positional embeddings of each sequence which are then used to form a context tensor. Thereafter, the neural encoder transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 . . . V, and a positional embedding matrix, Wp, that contains an embedding vector $P_j$, j=0 . . . T, for each position, where V is the size of the vocabulary and T is the length of the subtoken sequence. (Collectively, block 506).

The first encoder block of the neural encoder transformer model takes the context tensor as input and passes it through the multiple layers of multi-head self-attention, layer normalization and feed-forward neural network to finally produce the set of hidden representations If there are additional encoder blocks, the output of each encoder block is passed onto the next encoder block with the output of the last encoder block producing the set of hidden representations. (Collectively, block 506).

Training the Bag-of-Words Model

Turning back of FIG. 4, the Bag-of-Words model is trained on the source code tokens that appear in the source code files that will be contained in the retrieval source code database. The Bag-of-Words model is trained by extracting code segments from the source code files of a source code repository and computing the frequency each unique token or n-gram sequence of tokens occurs in a file. Upon completion of the training, the Bag-of-Words model will have built a vocabulary of unique tokens or n-gram sequence of tokens and the frequency of usage of each unique token or n-gram in the collection of source code files. (Collectively, block 404).

Generating the Retrieval Source Code Database

Figure 6:
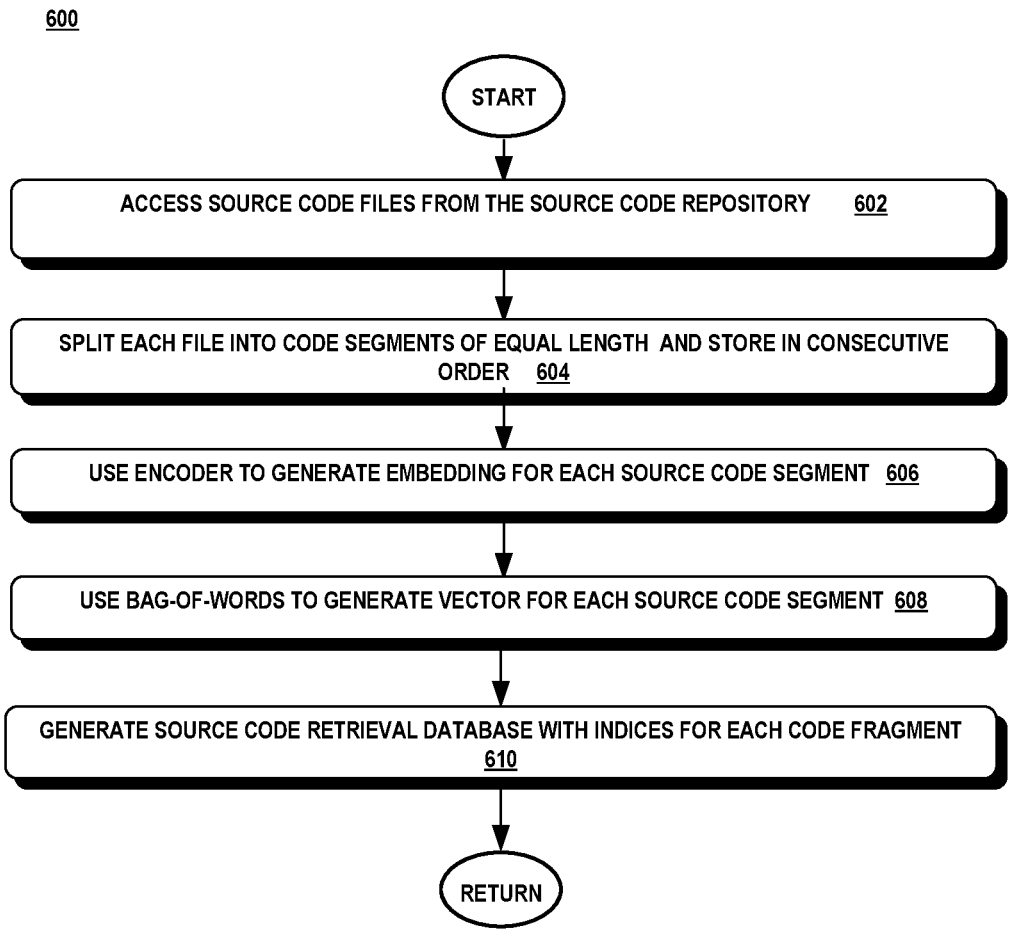
FIG. 6 is a flow diagram illustrating an exemplary method for constructing the retrieval source code database.

FIG. 6 illustrates a method 600 for constructing the retrieval source code database. Turning to FIGS. 1, 4 and 6, the retrieval source code database 122 is constructed from code segments 112 extracted from a number of source code files 108, extracted by the segmentation component 110, from the source code repository 106 (block 602). The segmentation component 110 transforms each source code file 108 into equally-sized code segments (block 604). Each code segment is stored consecutively in the database in the same order as the code segment appears in the original source code file (block 604). Each code segment is given two indices: an embedding index generated by the neural encoder transformer model (block 606); and a vector index generated by the Bag-of-Words model (block 608). The embedding vector index and the sparse vector index for each code segment is incorporated into the database 122 (block 610), (Collectively, block 406).

Training the Decoder Model

Turning back to FIG. 4, the neural decoder transformer model is trained to predict the source code tokens to complete a partially-formed source code snippet. The neural decoder transformer model is trained on source code snippets from various source code files. The model is trained in a similar manner as shown above with respect to training the neural encoder transformer model except for the input sequences and the operation of the output layer.

During training, the first decoder block 332A receives an input embedding 336 representing a start token, <START> and an input sequence representing a source code snippet. Thereafter, the first decoder blocks take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T Starting with the first token of the output sequence, the subtokens are passed through the self-attention and normalization layers and into the feed forward neural network. (Collectively, block 408).

The feed forward neural networks in the decoder blocks are trained iteratively, making multiple passes over the training dataset before converging to a minimum as noted above with respect to the encoder training. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 408).

Code Completion

Figure 7:
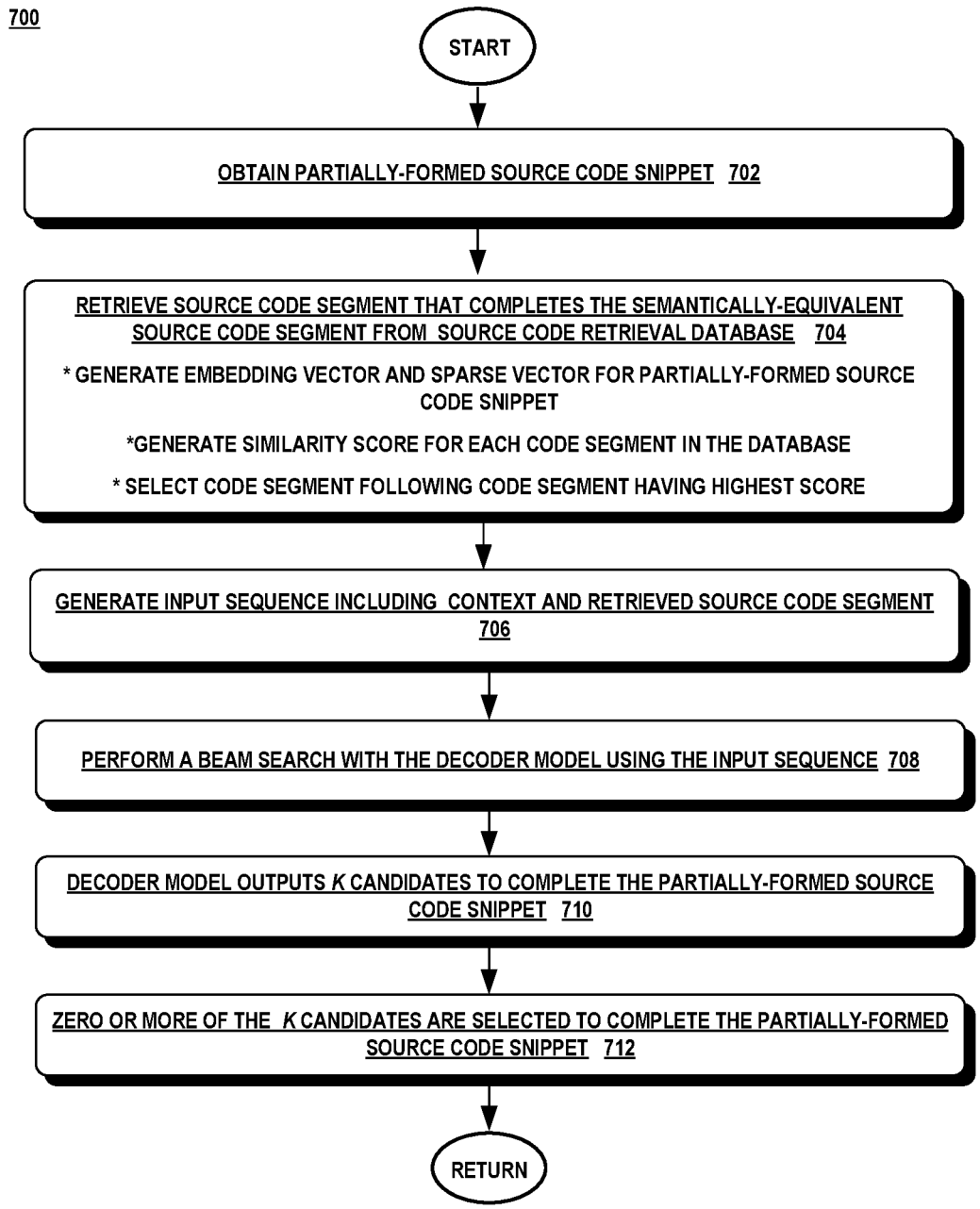
FIG. 7 is a flow diagram illustrating an exemplary method of a code completion system using retrieval-augmented code completion.

FIG. 7 illustrates one aspect of an exemplary inference method 700 utilizing the retrieval-augmented process in a code completion system.

Referring to FIGS. 2 and 7, a developer is creating or editing source code in a software development system, such as a source code editor 202. The source code editor 202 requests candidates to complete a current context of a partially-formed source code snippet in the editor. The partially-formed source code snippet may consist of a partially-formed method invocation, expression, statement, variable name, or other code element of the underlying programming language.

The code completion engine 124 receives the context of the partially-formed source code snippet 212. The context 212 includes a number of source code tokens preceding the current cursor position in the user interface. The context 212 includes the partially-formed source code snippet and a number of preceding tokens. (Collectively, block 702).

The context 212 is used by the encoder 114 and the Bag-of-Words ("BoW") model 116 to generate a corresponding embedding vector 218 and a sparse vector 220 for the context of the partially-formed source code snippet. The retrieval component 222 generates a similarity score for each entry in the database. The similarity score is the linear combination of an embedding-based score and a vector-based score.

The embedding-based score may be computed as the dot product between embedding vectors as follows: sim (q, c)=E(c)$^T$ E(q), where q is the context, c is the source code segment in the retrieval database, E(c)$^T$ is the transpose of the embedding vector index for an entry in the retrieval source code database 122, and E(q) is the embedding vector for the context of the partially-formed source code snippet. (Collectively, block 704).

The retrieval component 222 generates a score based on the Bag-of-Words vector of the context of the partially-formed source code snippet using a term-frequency based computation. In one aspect, the score may be computed using a Best Matching 25 ("BM25") algorithm which is as follows:

$$\sum_{i}^{n} IDF(q_i) \frac{f(q_i, D) * (k1 + 1)}{f(q_i, D) + k1 * \left(1 - b + b * \frac{fieldLen}{avgFieldLen}\right)} \quad (1)$$

where q is the query or partially-formed source code snippet of length n,
$q_i$ is the i-th source code token of the query,
IDF ($q_i$) is the inverse document frequency of $q_i$,
D is a source code file,
f($q_i$, D) is the frequency that $q_i$ appears in source code file D,
k1 is a variable that determines the term frequency saturation,
b is a variable that affects the length ratio,
fieldLen is the length of a source code file, and
avgFieldLen is the average length of all the source code files.

Both scores for each entry in the retrieval source code database is combined and the entry having the highest score is selected. The code segment immediately following the code segment having the highest score is then selected as the retrieved source code segment 224 (Collectively, block 704).

The context 212 and the retrieved source code segment 224 are concatenated to form an input sequence that is applied to the neural decoder transformer model (block 706).

The code completion component 204 uses a beam search 228 to find the most likely candidate sequences. A beam search iteratively generates tokens/subtokens by invoking the neural decoder transformer model 226. The output of the neural decoder transformer model 226 is a matrix of token probabilities for each position in a candidate sequence. The beam search engine 228 concentrates on the k most probable tokens at each iteration to get the best path to the most likely candidate sequence. At each iteration, each of the k most probable tokens are concatenated with the tokens in the preceding iterations to form a partial candidate sequence. (Collectively, block 708).

A beam search uses a breadth-first search to build a search tree. The search tree is composed of nodes at one or more inference levels. Each node represents a probability distribution generated by the neural transformer model for the tokens/subtokens in the model vocabulary. At each level, only the top k tokens/subtokens having the highest probabilities from the output distribution generated by the neural decoder transformer model are expanded to the next inference level. The variable k is preconfigured and also referred to as the beam width. Each of the k subtokens/tokens is then expanded into a search that updates the current context sequence with the selected subtoken/token to input into the neural decoder transformer model to generate an additional probability distribution for the next token in a sequence. This process is repeated until the end-of-line token is predicted as being the next likely token candidate. (Collectively, block 708).

Upon the completion of the beam search, the code completion engine 214 receives the top k candidates 210 likely to complete the partially-formed source code snippet which is sent back to the user interface (block 710). The developer may select zero or more of the candidates which is incorporated into the program in the editor (block 712). This process is repeated until the developer ends the session in the source code editor. (blocks 702-712).

Exemplary Operating Environment

Figure 8:
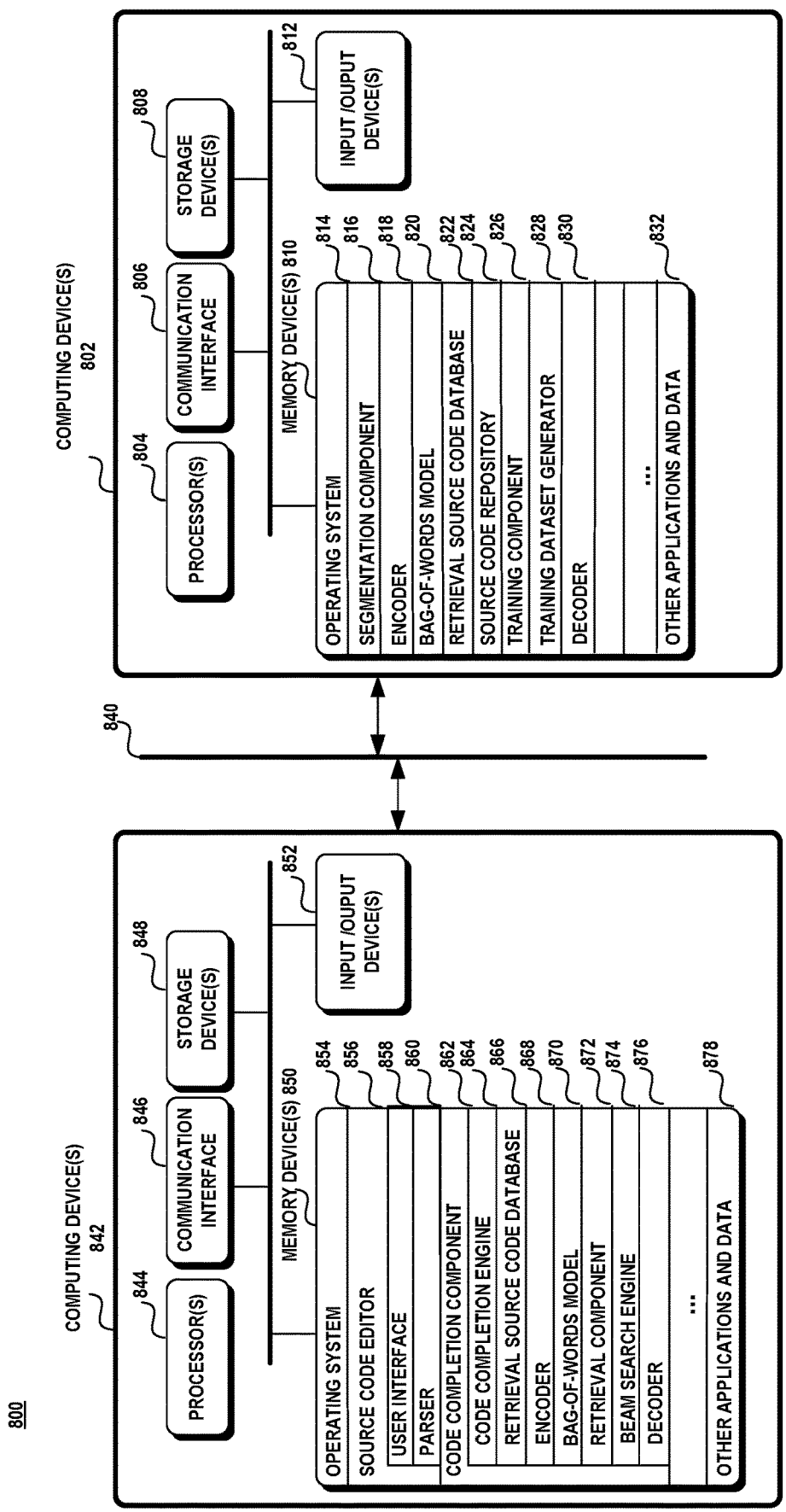
FIG. 8 is a block diagram illustrating an exemplary operating environment.

Attention now turns to a discussion of an exemplary operating environment 800. FIG. 8 illustrates an exemplary operating environment 800 in which one or more computing devices 802 are used to develop the models and database of the retrieval-augmented system and another set of computing devices 842 are used to perform the retrieval-augmented code completion. However, it should be noted that the aspects disclosed herein is not constrained to any particular configuration of the computing devices. In another aspect, a single computing device may be configured to develop the components of the retrieval-augmented system and perform the real-time code completion task.

A computing device 802, 842 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

A computing device 802, 842 may include one or more processors 804, 844, one or more communication interfaces 806, 846, one or more storage devices 808, 848 one or more memory devices or memories 810, 850, and one or more input/output devices 812, 852. A processor 804, 844 may be any commercially available or customized processor and may include dual microprocessors and multi-processor architectures. A communication interface 806, 846 facilitates wired or wireless communications between the computing device 802, 842 and other devices. A storage device 808, 848 may be computer-readable medium that does not contain propagating signals, such as modulated data signals transmitted through a carrier wave. Examples of a storage device 808, 848 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 808, 848 in the computing devices 802, 842. The input/output devices 812, 852 may include a keyboard, mouse, pen, voice input device, touch input device, display, speakers, printers, etc., and any combination thereof.

A memory device or memory 810, 850 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 810, 850 may also include one or more external storage devices or remotely located storage devices that do not pertain to propagated signals, such as modulated data signals transmitted through a carrier wave.

A memory device 810, 850 may contain instructions, components, and data. A component is a software program that performs a specific function and is otherwise known as a module, program, and/or application. The memory device 810 may include an operating system 814, a segmentation component 816, an encoder 818, a Bag-of-Words model 820, a retrieval source code database 822, a source code repository 824, a training component 826, a training dataset generator 828, a decoder 830, and other applications and data 832.

The memory device 850 may include an operating system 854, a source code editor 856 including a user interface 858 and a parser 860, a code completion component 862 including a code completion engine 864, a retrieval source code database 866, an encoder 868, a Bag-of-Words model 870, a retrieval component 872, a beam search engine 874, and a decoder 876, and other applications and data 878.

A computing device 802, 842 may be communicatively coupled via a network 840. The network 840 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 840 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of generating a code completion system that operates with reduced computing resources while maintaining a high accuracy level. The technical feature associated with addressing this problem is the augmentation of a hint to the context of a partially-formed source code snippet that is used by a neural decoder transformer model to predict the most likely source code candidate to complete the partially-formed source code snippet. The hint is the source code segment that completes the most semantically-similar source code segment to the partially-formed source code snippet.

The technical effect achieved is the reduction of the training corpus needed by the decoder model to achieve a high level of accuracy. Training on a large corpus of samples increases the accuracy of the model but increasing the number of parameters used by the model and its size. A large sized model requires additional computing resources to train and deploy. The addition of the hint provides the model with guidance on making its predictions with without requiring the additional training and deployment cost.

CONCLUSION

A system is disclosed comprising: one or more processors; and a memory that stores one or more programs that are configured to be executed by the one or more processors, the one or more programs including instructions to perform actions that: obtain a partially-formed source code snippet in a source code program to complete; search for a semantically-similar source code snippet of the partially-formed source code snippet in a retrieval source code database, wherein the retrieval source code database includes a plurality of source code segments, wherein the semantically-similar source code snippet and the partially-formed source code snippet differ; acquire a source code segment that completes the semantically-similar source code snippet of the partially-formed source code snippet from the retrieval source code database; and predict a candidate to complete the partially-formed source code snippet from a deep learning model given a context of the partially-formed source code snippet and the source code segment that completes the semantically-similar source code snippet.

In an aspect, the one or more programs include instructions to perform actions that: upon user input, insert the candidate into the source code program to complete the partially-formed source code snippet. In an aspect, each source code segment in the retrieval source code database is associated with a hybrid encoding. In an aspect, the search for the semantically-similar source code snippet includes instructions to perform actions that: generate a hybrid encoding for the context of the partially-formed source code snippet; and search for the semantically-similar source code snippet based on the hybrid encoding of the context closely similar to a hybrid encoding of a select one of the source code segments of the retrieval source code database.

In an aspect, the hybrid encoding includes an embedding vector and a sparse vector, the embedding vector is generated by a neural encoder, and the sparse vector is generated by a term-frequency encoder. In an aspect, the neural encoder is a neural encoder transformer model with attention. In an aspect, the deep learning model includes a neural decoder transformer model with attention.

A computer-implemented method is disclosed, comprising: deploying in a code completion system a retrieval source code database, wherein the retrieval source code database includes a plurality of source code segments, each of the plurality of source code segments associated with dual encoding, wherein the dual encodings include an embedding vector and a sparse vector; receiving a partially-formed source code snippet from a source code program; searching for a semantically-similar source code snippet of the partially-formed source code snippet in the retrieval source code database using a dual encoding of the partially-formed source code snippet; retrieving from the retrieval source code database a source code segment that completes the semantically-similar source code segment; applying a context of the partially-formed source code snippet and the retrieved source code segment to a deep learning model that predicts a candidate to complete the partially-formed source code snippet; and inserting the candidate into the source code program.

In an aspect, the computer-implemented method further comprises: constructing the embedding vector of the partially-formed source code snippet from a neural encoder. In an aspect, the computer-implemented method further comprises: constructing the sparse vector of the partially-formed source code snippet from a term-frequency encoder. In an aspect, the term-frequency encoder is a Bag-of-Words encoder. In an aspect, the computer-implemented method further comprises: computing a similarity score for each of the plurality of source code segments of the retrieval source code database with respect to the partially-formed source code snippet based on a similarity of the dual encodings of the partially-formed source code snippet with the dual encodings of each of the plurality of source code segments; and selecting a select one of the plurality of source code segments having a highest similarity score as the semantically-similar source code segment.

In an aspect, the computer-implemented method further comprises: obtaining the source code segment in the retrieval source code database that immediately follows the semantically-similar source code segment as the retrieved source code segment. In an aspect, the deep learning model is a neural decoder transformer model with attention. In an aspect, the neural encoder is a neural encoder transformer model with attention.

A device is disclosed, comprising a processor and a memory. The processor is configured to execute instructions stored in the memory to perform acts that: detect a partially-formed source code snippet of a source code program to complete; generate a first encoding of the partially-formed source code snippet from a first encoder and a second encoding of the partially-formed source code snippet from a second encoder, wherein the first encoder and the second encoder differ; search for a semantically-similar source code segment for the partially-formed source code snippet from a retrieval source code database using the first encoding and the second encoding, wherein the retrieval source code database includes a plurality of source code segments indexed by a first encoding vector and a second encoding vector; extract a retrieved source code segment that completes the semantically-similar source code segment from the retrieval source code database; obtain a candidate to complete the first sequence of tokens from a deep learning decoder model using a context of the partially-formed source code snippet and the retrieved source code segment; and complete the partially-formed source code snippet with the candidate.

In an aspect, the first encoder and the second encoder are constructed in an offline process. In an aspect, the retrieval source code database is constructed in an offline process using the first encoder and the second encoder to generate the dual encodings for each of the source code segments of the retrieval source code database. In an aspect, the deep learning model is a neural decoder model with attention. In an aspect, the first encoder is a neural encoder transformer model with attention and the second encoder is a term-frequency based encoder model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

What is claimed:

1. A system comprising:
a processor; and
a memory that stores a program that is configured to be executed by the processor, the program comprising instructions to perform actions that:
obtain a partially-formed source code snippet in a source code program to complete;
generate an embedding of the partially-formed source code snippet and a sparse vector of the partially-formed source code snippet;
search for a semantically-similar source code snippet to the partially-formed source code snippet in a retrieval source code database, wherein the retrieval source code database comprises a plurality of source code segments arranged in a consecutive order, wherein each source code segment in the retrieval source code database is accessed by a respective embedding and a respective sparse vector, wherein the search is based on matching the embedding of the partially-formed source code snippet with the embeddings of each source code segment and matching the sparse vector of the partially-formed source code snippet with the sparse vector of each source code segment;
select the semantically-similar source code snippet from the retrieval source code database having a closest match to the embedding of the partially-formed source code snippet and to the sparse vector of the partially-formed source code snippet;
obtain a source code segment from the retrieval source code database immediately following the selected semantically-similar source code; and
predict a candidate to complete the partially-formed source code snippet from a deep learning model given the partially-formed source code snippet and the source code segment that immediately follows the selected semantically-similar source code snippet in the retrieval source code database.

2. The system of claim 1, wherein the program includes instructions to perform actions that:
upon user input, insert the candidate into the source code program to complete the partially-formed source code snippet.

3. The system of claim 1, wherein the deep learning model is given a context of the partially-formed source code snippet.

4. The system of claim 1, wherein the search for the semantically-similar source code snippet includes instructions to perform actions that:
generate a score for each source code segment of the retrieval source code database, wherein the score is a linear combination of an embedding-based score and a sparse vector-based score; and
select as the semantically-similar source code snippet, the source code segment from the retrieval source code database having a highest score.

5. The system of claim 4, wherein the embedding-based score is based on the embedding of the partially-formed source code snippet and a transpose of an embedding vector index of a respective source code segment.

6. The system of claim 4, wherein the sparse vector-based score is based on a term-frequency computation of the partially-formed source code snippet.

7. The system of claim 1, wherein the deep learning model includes a neural transformer model with attention.

8. A computer-implemented method, comprising:
receiving a partially-formed source code snippet in a source code program to complete;
accessing a retrieval source code database comprising a plurality of source code segments stored in a consecutive order, wherein each source code segment of the plurality of source code segments is accessed by an embedding vector and a sparse vector;
generating an embedding for the partially-formed source code snippet and a sparse vector for the partially-formed source code snippet;
searching for a semantically-similar source code snippet to the partially-formed source code snippet in the retrieval source code database, wherein the search is based on matching the embedding of the partially-formed source code snippet with the embedding of each source code segment and matching the sparse vector of the partially-formed source code snippet with the sparse vector of each source code segment;
selecting the semantically-similar source code snippet having a closest match to the embedding of the partially-formed source code snippet and to the sparse vector of the partially-formed source code snippet;
retrieving a source code segment from the retrieval source code database immediately following the selected semantically-similar source code in the retrieval source code database; and
generating a candidate to complete the partially-formed source code snippet from a deep learning model given the partially-formed source code snippet and the source code segment that immediately follows the selected semantically-similar source code snippet.

9. The computer-implemented method of claim 8, further comprising:
displaying the candidate in the source code program; and upon user input selecting the candidate, inserting the candidate into the source code program to complete the partially-formed source code snippet.

10. The computer-implemented method of claim 8, wherein the deep learning model is given a context of the partially-formed source code snippet that comprises source code immediately preceding the partially-formed source code snippet.

11. The computer-implemented method of claim 8, wherein the search for the semantically-similar source code snippet further comprises:
generating a score for each source code segment of the retrieval source code database, wherein the score is a linear combination of an embedding-based score and a sparse vector-based score; and
selecting the source code segment having a highest score as the semantically-similar source code snippet.

12. The computer-implemented method of claim 11, wherein the embedding-based score is based on the embedding of the partially-formed source code snippet and a transpose of an embedding vector index of a respective source code segment.

13. The computer-implemented method of claim 11, wherein the sparse vector-based score is based on a term-frequency computation of the partially-formed source code snippet.

14. The computer-implemented method of claim 8, wherein the deep learning model includes a neural transformer model with attention.

15. A hardware storage device having stored thereon computer executable instructions that are structured to be executable by a processor of a computing device to thereby cause the computing device to perform actions that:
deploy, in a code completion system, a retrieval source code database, wherein the retrieval source code database comprises a plurality of source code segments stored in a consecutive order, wherein each of the plurality of source code segments is indexed by an embedding vector and a sparse vector;
receive a partially-formed source code snippet from a source code program;
generate an embedding vector and sparse vector for the partially-formed source code snippet;
search for a semantically-similar source code snippet to the partially-formed source code snippet from the retrieval source code database based on the embedding vector and the sparse vector of the partially-formed source code snippet closely matching an embedding vector and sparse vector of a source code segment in the retrieval source code database;
retrieve from the retrieval source code database a source code segment that immediately follows the semantically-similar source code segment in the retrieval source code database; and
generate a candidate to complete the partially-formed source code snippet from a deep learning model given the partially-formed source code snippet and the source code segment that immediately follows the selected semantically-similar source code snippet in the retrieval source code database.

16. The hardware storage device of claim 15 having stored thereon computer executable instructions that are structured to be executable by a processor of a computing device to thereby cause the computing device to perform actions that:
construct the embedding vector of the partially-formed source code snippet from a neural encoder.

17. The hardware storage device of claim 15 having stored thereon computer executable instructions that are structured to be executable by a processor of a computing device to thereby cause the computing device to perform actions that:
construct the sparse vector of the partially-formed source code snippet from a term-frequency encoder.

18. The hardware storage device of claim 15 having stored thereon computer executable instructions that are structured to be executable by a processor of a computing device to thereby cause the computing device to perform actions that:
compute a similarity score for each of the plurality of source code segments of the retrieval source code database with respect to the partially-formed source code snippet, wherein the similarity score is based on a similarity of the embedding vector of the partially-formed source code snippet with the embedding vector of each source code snippet in the retrieval source code database and a similarity of the sparse vector of the partially-formed source code snippet with the sparse vector of each source code snippet in the retrieval source code database; and
select one of the plurality of source code segments having a highest similarity score as the semantically-similar source code segment.

19. The hardware storage device of claim 15, wherein each of the plurality of source code segments in the retrieval source code database are equally-sized and stored in a same order as in a corresponding program from which a respective source code segment was retrieved.

20. The hardware storage device of claim 15, wherein the deep learning model is a neural transformer model with attention.

* * * * *